(12) United States Patent
Linari

(10) Patent No.: US 12,138,725 B2
(45) Date of Patent: Nov. 12, 2024

(54) METHOD AND SYSTEM FOR DETECTING EQUIPMENT MALFUNCTIONS AND/OR DEFECTS IN A WORKPIECE

(71) Applicant: LINARI ENGINEERING SRL, Pisa (IT)

(72) Inventor: Stefano Linari, Pisa (IT)

(73) Assignee: LINARI ENGINEERING SRL, Pisa (IT)

( * ) Notice: Subject to any disclaimer, the term of this patent is extended or adjusted under 35 U.S.C. 154(b) by 372 days.

(21) Appl. No.: 17/614,097

(22) PCT Filed: May 26, 2020

(86) PCT No.: PCT/IB2020/054950
§ 371 (c)(1),
(2) Date: Nov. 24, 2021

(87) PCT Pub. No.: WO2020/240402
PCT Pub. Date: Dec. 3, 2020

(65) Prior Publication Data
US 2022/0219275 A1    Jul. 14, 2022

(30) Foreign Application Priority Data

May 27, 2019   (IT) ........................ 102019000007332

(51) Int. Cl.
*B23Q 17/09*   (2006.01)
*B23Q 17/20*   (2006.01)
*B23Q 17/24*   (2006.01)

(52) U.S. Cl.
CPC ....... *B23Q 17/098* (2013.01); *B23Q 17/0957* (2013.01); *B23Q 17/20* (2013.01);
(Continued)

(58) Field of Classification Search
CPC ................ B23Q 17/20; B23Q 17/2457; B23Q 17/2471; B23Q 17/0957; B23Q 17/098
See application file for complete search history.

(56) References Cited

U.S. PATENT DOCUMENTS

| 10,564,031 B1 * | 2/2020 | Stoia ........................ G01H 3/08 |
| 2008/0133439 A1 * | 6/2008 | Ikeda ........................ G01H 1/12 |
| | | 706/20 |

(Continued)

OTHER PUBLICATIONS

Kosmopoulos, Dimitrios; et al., "Robust Visual Behavior Recognition", IEEE Signal Processing Magazine, IEEE Service Center, Piscataway, NJ, US, vol. 27, No. 5, Sep. 2010, 12 pages.

(Continued)

*Primary Examiner* — Vincent H Tran
(74) *Attorney, Agent, or Firm* — Leber IP LAW; Celia H. Leber

(57) ABSTRACT

The present invention concerns a method and a system for detecting malfunctions in an apparatus and/or defects in a workpiece processed by said apparatus. The method provides for acquiring a sound signal emitted by an apparatus during an operation cycle of the same, then comparing the sound signal with a plurality of audio tracks stored in a memory area for determining a malfunction of the apparatus and/or a defectiveness of the workpiece processed by the apparatus based on the result of said comparison. The operation cycle is subdivided into a plurality of work phases and during the acquisition of the sound signal a work phase of said plurality of work phases is identified. Each audio track of the plurality of stored audio tracks comprises an audio component relating to acquired sound signals, and additional information data comprising at least one identifier of the work phase executed by the apparatus during the acquisition of the sound signals of the audio component. The plurality of audio tracks used for the comparison with the (Continued)

sound signal is a group of audio tracks of the plurality of audio tracks whose identifier of the work phase of the apparatus corresponds to the identified work phase. The identification data of the audio tracks additionally comprise at least one identifier of a plurality of components activated during the phase to which the audio component refers, and it is further provided for a) identifying a plurality of components activated during the identified work phase, b) on the basis of the plurality of activated components, identifying a set of comparison phases among the plurality of phases of the operation cycle, and c) identifying as defective at least one component between the plurality of components activated during the work phase and/or the workpiece, on the basis of the audio tracks relating to the set of comparison phases identified and/or on the basis of sound signals acquired during the identified comparison phases.

17 Claims, 6 Drawing Sheets

(52) U.S. Cl.
CPC ..... *B23Q 17/2409* (2013.01); *B23Q 17/2457* (2013.01); *B23Q 17/2471* (2013.01)

(56) References Cited

U.S. PATENT DOCUMENTS

| | | | | |
|---|---|---|---|---|
| 2011/0282654 | A1* | 11/2011 | Takechi | G01M 13/028 704/E19.001 |
| 2013/0035776 | A1* | 2/2013 | Kunstadt | G05B 19/4163 700/94 |
| 2015/0082887 | A1 | 3/2015 | Haschke et al. | |
| 2015/0258650 | A1* | 9/2015 | Okamoto | G05B 19/406 381/56 |
| 2016/0327522 | A1* | 11/2016 | Tanaka | G01M 15/12 |
| 2017/0146488 | A1* | 5/2017 | Gold | B29C 64/386 |
| 2017/0363030 | A1* | 12/2017 | Melis | F02D 35/027 |
| 2018/0011059 | A1* | 1/2018 | Trayhan, Jr. | G01H 1/006 |
| 2018/0356282 | A1 | 12/2018 | Fukuda et al. | |
| 2020/0086489 | A1* | 3/2020 | Goto | G05B 19/4061 |

OTHER PUBLICATIONS

Park, Daehyung; et al., "Multimodal Execution Monitoring for Anomaly Detection During Robot Manipulation", 2016 IEEE International Conference on Robotics and Automation (ICRA), IEEE, May 16, 2016, 8 pages.

International Application No. PCT/IB2020/054950, International Search Report and Written Opinion mailed Sep. 28, 2020, 17 pages.

* cited by examiner

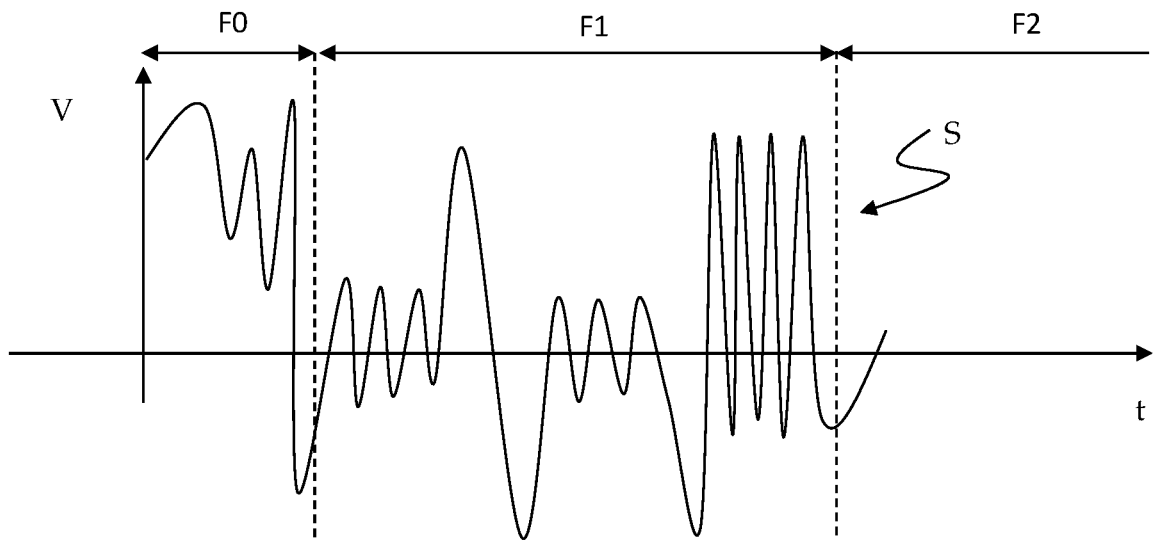
FIG. 3
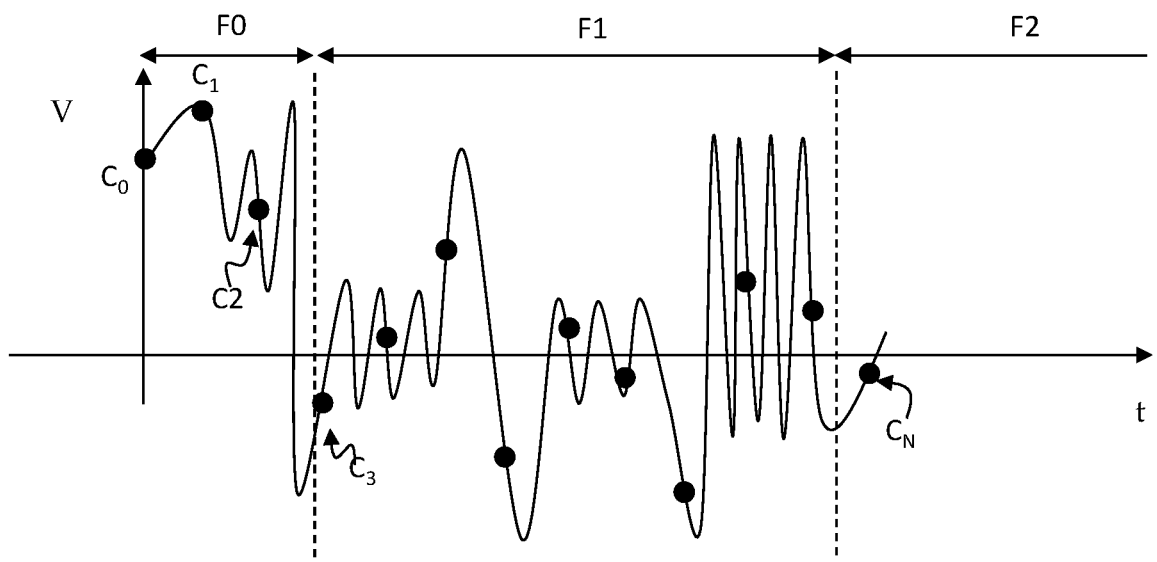
FIG. 4
| | | | | | | | | | | | | | | | | |
|---|---|---|---|---|---|---|---|---|---|---|---|---|---|---|---|---|
| 1 | 1 | 1 | 0 | 1 | 1 | 1 | 1 | 1 | 0 | 1 | 1 | ... | ... | 1 | 1 | 0 | 1 |
FIG. 5

METHOD AND SYSTEM FOR DETECTING EQUIPMENT MALFUNCTIONS AND/OR DEFECTS IN A WORKPIECE

RELATED APPLICATIONS

This application is a national phase entry of International Patent Application No. PCT/IB2020/054950, filed May 26, 2020, which claims priority from Italian Patent Application No. 102019000007332 filed May 27, 2019.

TECHNICAL FIELD

The present invention relates to methods and systems for detecting malfunctions of apparatuses and/or defectivenesses—for example of the construction type—in workpieces. In particular, the invention relates to systems and methods that detect malfunctions and defectivenesses by analysing the sounds emitted by an apparatus during the operation thereof or by the workpieces, if specifically stimulated.

BACKGROUND

The monitoring of the apparatuses is important to guarantee the quality of the manufactured product and the safety of the workers. Being able to quickly identify a malfunction and being able to intervene quickly is therefore very important in the industrial world. In this context, many systems that allow to detect malfunctions of apparatuses by analysing the sounds emitted by the apparatus itself have been presented.

A fault detection system and a method to determine whether a fault exists in a rotating element of a vehicle are known from patent EP1502093B1. The system comprises a transducer, a diagnostic sampler and a controller. The transducer can be a microphone located in the vehicle to convert sounds into an electrical signal. The electrical signal comprises a noise component generated by the rotating element. The diagnostic sampler is connected to the transducer and provides a sample of the electrical signal from the transducer to the controller. The controller has functional aspects such as envelope detection, spectrum analysis and fault detection.

A system for the identification of anomalies, and therefore the determination of the operation condition of the monitored apparatuses, through the continuous calculation of the power spectrum of the monitored sound is known from the Canadian patent CA2337000C. The system has two operation modes: learning and operating. The system is put into learning mode during a period of time in which the machine or process to be monitored is known to operate normally. During the learning mode, the maximum and minimum acoustic power in output from each of a plurality of digital bandpass filters is continuously maintained and updated in a data memory as the acoustic signature of the machine or process to be monitored. During the operation mode, the system continuously compares—in real time—the outputs of the filters with the acoustic signature stored during the learning mode and activates a panel lamp and a relay if the output of any of the bandpass filters deviates from the upper or lower decibel limits of the acoustic signature beyond a value set by means of a sensitivity selector located on a control panel. The system provides two alarm levels: warning, to indicate a developing fault, and danger, to indicate a situation that requires immediate corrective action.

Systems using acoustic data and artificial intelligence for the non-intrusive detection of malfunctions or defects in an apparatus, in order to improve quality and better predict apparatus faults are also known. These systems acquire an audio track of a machine that is operating, for example the noise emitted by a motor, and compares it in real time with audio files that represent operation anomalies, so as to identify operation malfunctions of the monitored apparatus.

However effective, the known systems require a lot of computational capacity, which sometimes makes them unsuitable for integration into industrial apparatuses, where a programmable logic controller (PLC or PAC) which does not have high computational capabilities is normally used. Document US 2018/0356282 is also known, which describes a diagnostic device configured to receive context information referring to a specific operation performed by a target component and measurement information relating to a physical quantity—for example an acoustic track—which varies according to of the operation performed by the target component. The diagnostic device is also configured to determine a status of the target component on the basis of the measurement information detected while the target component is performing the determined operation, and on the basis of a model corresponding to the context information received. The diagnostic device described in document US 2018/0356282 is suitable for monitoring a specific component capable of carrying out machinings, such as for example a component of a tool machine, in order to identify a malfunction. On the contrary, the diagnostic device described in US 2018/0356282 does not appear suitable for monitoring more complex systems, for example comprising a plurality of components operating simultaneously, and identifying which component may be the cause of a malfunction. Furthermore, said diagnostic device does not even appear capable of detecting anomalies of third elements with respect to the tool machines with which said machines interact.

OBJECTS AND SUMMARY OF THE INVENTION

In light of the above, the problem underlying the present invention is that of devising a system and a method for monitoring the apparatuses based on acoustic detection, which is effective in the detection of faults, but which requires less computational effort than that required from the state of the art.

Within the scope of this problem, an object of the present invention is that of providing a system and a method which allow to identify not only a malfunction status of an apparatus, but also to identify the specific component of the apparatus which causes the malfunction.

A further object of the present invention is that of devising a system and a method which also allow to detect anomalies on third elements on or with which the apparatus interacts.

Another object of the present invention is that of providing a system and a method for monitoring apparatuses which takes into account different operating conditions of the apparatus.

These and further objects of the present invention are achieved by means of a method for detecting malfunctions in an apparatus according to claim 1, and by means of a relative system adapted to implement such a method.

According to a first aspect, the invention therefore concerns a method for detecting malfunctions in an apparatus and/or defectivenesses in a workpiece processed by said apparatus. The method provides for acquiring a sound signal emitted by an apparatus during an operation cycle of the same; then the sound signal is compared with a plurality of audio tracks stored in a memory area to determine a malfunction of the apparatus and/or a defectiveness of the workpiece processed by the apparatus based on the result of said comparison. The operation cycle is subdivided into a plurality of work phases and during the acquisition of the sound signal a work phase of said plurality of work phases is identified. Each audio track of the plurality of stored audio tracks comprises an audio component relating to acquired sound signals, and additional information data comprising at least one identifier of the work phase executed by the apparatus during the acquisition of the sound signals of the audio component. The plurality of audio tracks used for the comparison with the sound signal is a group of audio tracks of the plurality of audio tracks whose identifier of the work phase of the apparatus corresponds to the identified work phase.

According to the present invention, the identification data of the audio tracks additionally comprise at least one identifier of a plurality of components activated during the phase to which the audio component refers, and it is further provided for a) identifying a plurality of components activated during the identified work phase, b) on the basis of the plurality of activated components, identifying a set of comparison phases among the plurality of phases of the operation cycle, and c) identifying as defective at least one component between the plurality of components activated during the work phase and/or the workpiece, on the basis of the audio tracks relating to the set of comparison phases identified and/or on the basis of sound signals acquired during the identified comparison phases.

Said solution offers the advantage of considerably reducing the computational complexity of the software algorithm that implements the method, since the selection of the audio tracks, made starting from the identified work phase, allows the algorithm to converge to the result more quickly, reducing considerably the number of tracks with which the comparison is to be made.

In a variant of the invention, the plurality of audio tracks with which the sound signal is compared is stored in a plurality of computers connected to each other and in which the step of comparing the sound signal with said plurality of audio tracks is executed in a distributed manner between said plurality of computers or locally on a computer receiving the sound signal.

Said solution offers the advantage of reducing the necessary memory capacity.

Preferably, then, the additional information data of each track comprises a value of an operating parameter of the apparatus, for example an ambient temperature. During the acquisition of the sound signal, the value of said parameter of operation of the apparatus is measured. In this embodiment, therefore, for the comparison with the sound signal, the audio tracks which comprise a value of said operating parameter which deviates from the reference value by more than a deviation percentage chosen in the range between 0% and ±20% are selected in the group of audio tracks.

In a variant of the invention, the set of comparison phases comprises phases of the operation cycle in which at least one component of the plurality of components activated during the work phase is activated, and the at least one component in common is activated in the comparison phase and in the work phase with substantially equal values of the operating parameters.

Said solution further reduces the computational complexity of the algorithm and at the same time improves the identification of any malfunctions. Indeed, the applicant has identified that different operating conditions can cause different sounds of the apparatus. For example, the viscosity of the lubricating oils used in the gears varies with temperature, therefore the frictions between the components can be different and give rise to different noises. By comparing the acquired sound signal with audio tracks in which the apparatus operated under identical or similar conditions, a more precise result is obtained because any deviations between the acquired sound signal and audio tracks could depend not on malfunctions of the apparatus, but on the different work conditions.

According to a further aspect, then, the method also provides for a process for identifying the defective components which is advantageously implemented in the event that the acquired sound signal is related to a work phase of the apparatus in which various mechanical components are activated, and—at the same time—there is a malfunction of the apparatus. In this case, the method further comprises the steps of:

storing a first deviation data, which is the deviation between the sound signal and one of said plurality of audio tracks which gave rise to a malfunction signalling of the apparatus, selecting a component among those active during the acquisition of the sound signal, comparing the sound signal with at least one further audio track relating to a different work phase of the apparatus, said different work phase being a work phase in which the selected component is activated in a similar manner and in which a malfunction of the apparatus has been recorded, storing at least one further deviation data, said at least one further deviation data representing a deviation between the acquired sound signal and said at least one further audio track, comparing the first deviation data with each further deviation data and verifying if they differ less than a threshold value, signalling that the component identified is defective in the event that in most comparisons the first deviation data and the further deviation data differ less than a threshold value.

Said solution offers the advantage of allowing the identification not only of a generic malfunction of the machine, but also allows to provide an indication on which one the defective component causing the malfunction is, so as to allow a faster repair of the apparatus.

In a variant of the invention, the method provides for acquiring a sound signal emitted by the apparatus during at least a first comparison phase of the set of comparison phases; comparing the acquired sound signal with a plurality of audio tracks relating to the at least a first comparison phase; and according to the outcome of the comparison, identifying as defective at least one component between said plurality of components activated both during the at least a first comparison phase and during the work phase, or the workpiece.

In particular, if the outcome of the comparison identifies a malfunction of the at least a first comparison phase and during the at least a first comparison phase only one component in common is activated, the only component in common is signalled as a probably defective component.

If the outcome of the comparison identifies a malfunction of the at least a first comparison phase and during the at least a first comparison phase a subset of the components activated during the work phase is activated, the components activated in the work phase, but not activated during the at least a first comparison phase are identified as non-defective and the set of comparison phases is updated, keeping only the comparison phases in which the components belonging to the subset of the components are activated.

Finally, if the outcome of the comparison does not identify a malfunction of the comparison phase, the active components during the comparison phase are identified as non-defective and the set of comparison phases is updated, keeping only the comparison phases in which the remaining components are activated.

If there is no longer any comparison phase in the list of comparison phases, then the workpiece is signalled as probably defective.

Said solution advantageously allows to identify which one the defective component or workpiece causing the malfunction is, in extremely rapid times and with high diagnostic reliability.

In a variant of the invention, the method provides for storing an audio track comprising an audio component corresponding to the acquired sound signal, and at least one additional information data included in the group consisting of: an identification data identifying the work phase of the apparatus, data relating to mechanical components activated during the acquisition of the sound signal, environmental parameters relating to the operating conditions of the apparatus during the acquisition of the sound signal, operating parameters of the apparatus and/or its components during the acquisition of the sound signal absolute and/or relative position of the components and workpieces during the acquisition of the sound signal.

Said solution offers the advantage that the set of audio tracks available for comparison is generated by the local acquisition of the sound signal on the same apparatus and under the operating conditions of the apparatus. This allows a better investigation of the malfunctions than using pre-recorded audio tracks on other similar apparatus or under different operating conditions.

Preferably, then, in the event that the method determines a malfunction of the apparatus and/or identifies a defective component, the method further provides for a verification of the malfunction and/or of the defective component by an operator. If the operator confirms the malfunction of the apparatus and/or the defectiveness of the component, then a data identifying the track as relating to a phase with malfunctions and/or defective components is recorded in the additional information data.

The verification by the operator of the malfunction allows to improve the learning of the software and to optimise the future detection of malfunctions.

Again, in a variant of the invention, the work phase is identified independently, acquiring a sequence of images of the apparatus, processing the acquired images to determine the position of the plurality of activated components and/or at least one workpiece on which the activated components are acting; and determining the work phase on the basis of the determined positions.

This advantageously allows to apply the method according to the invention also to apparatuses that do not allow access to their control unit or in any case to perform a diagnosis on components that are not directly activated or operationally connected to the control unit that carries out the malfunction diagnosis.

According to a further aspect, the invention also refers to a system capable of implementing a method as described above and in detail in the description that follows.

In particular, according to a first embodiment, the system for detecting malfunctions in an apparatus and/or defectivenesses in a workpiece processed by said apparatus, comprises at least a transducer for the acquisition of a sound signal emitted by the apparatus during an operation cycle of the apparatus, a memory area adapted to preserve a plurality of audio tracks, wherein each audio track of the plurality of audio tracks comprises an audio component relating to acquired sound signals, and additional information data comprising at least one identifier of the work phase executed by the apparatus during the acquisition of the audio signals of the audio component, and a control unit operatively connected to the transducer and to the memory area. The control unit is configured for identifying, among a plurality of work phases into which the operation cycle of the apparatus is subdivided, a work phase executed by the apparatus during the acquisition of the sound signal, selecting a plurality of audio tracks stored in the memory area on the basis of the identified work phase, comparing the sound signal with the audio component of the plurality of selected audio tracks, and determining a malfunction of the apparatus and/or a defectiveness of the workpiece processed by the apparatus based on the basis of the comparison.

According to the present invention, the identification data of the audio tracks additionally comprise at least one identifier of a plurality of components activated during the phase to which the audio component refers, and the control unit is further configured to identify a plurality of components activated during the work phase.

On the basis of the activated components, the control unit, therefore, identifies a set of comparison phases of the operation cycle with which a second plurality of audio tracks stored in the memory area is associated and identifies as defective at least one component between the plurality of components activated during the work phase and/or the workpiece on the basis of the audio tracks relating to the set of comparison phases identified and/or on the basis of sound signals acquired during the identified comparison phases.

In a variant of the invention, the memory area preserves information adapted to identify the work phase executed by the apparatus during the acquisition of the sound signal among the plurality of work phases into which the operation cycle of the apparatus is subdivided.

In another variant of the invention, the control unit is operatively connected to an image detector configured to frame the apparatus and the control unit is further configured to carry out an image processing of a sequence of images received by the image detector to identify the work phase executed by the apparatus during the acquisition of the sound signal.

This advantageously allows to monitor also apparatuses which do not allow access to their control unit or in any case to carry out a diagnosis on components that are not directly activated or operationally connected to the control unit.

Preferably, the control unit is configured to receive a user command that confirms, denies or corrects a malfunction assessment of the apparatus made by the control unit and/or an indication given by the control unit that a component is defective.

This solution allows a faster learning by the system and therefore a more accurate detection of the malfunctions and/or a more careful identification of the defective components.

BRIEF DESCRIPTION OF THE DRAWINGS

Further characteristics and advantages of the present invention will be more evident from the following description of some preferred embodiments thereof made with reference to the appended drawings.

The different features in the individual configurations can be combined with each other as preferred according to the previous description, should it be necessary to avail of the advantages resulting specifically from a particular combination.

Figure 1:
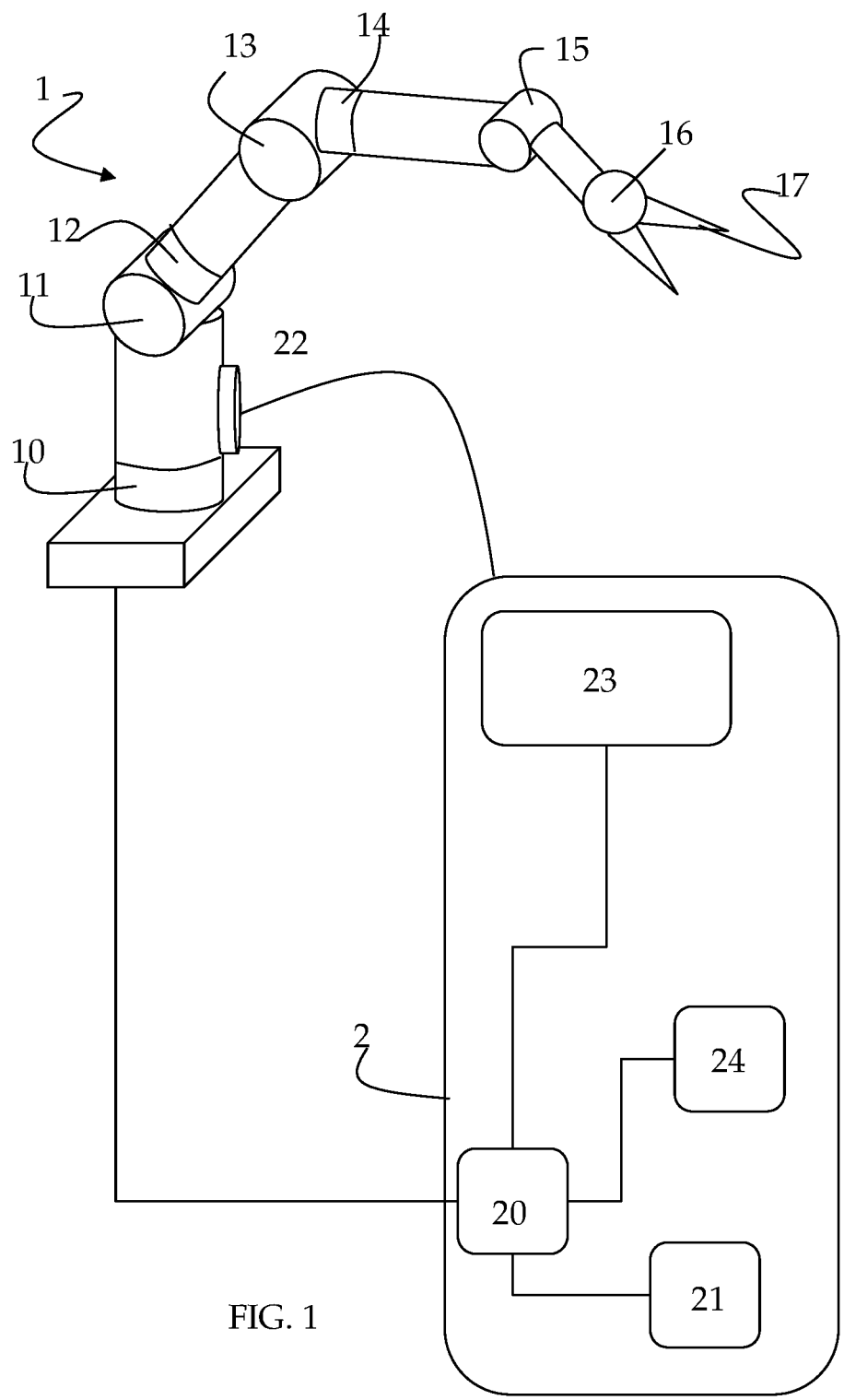
Figure 2:
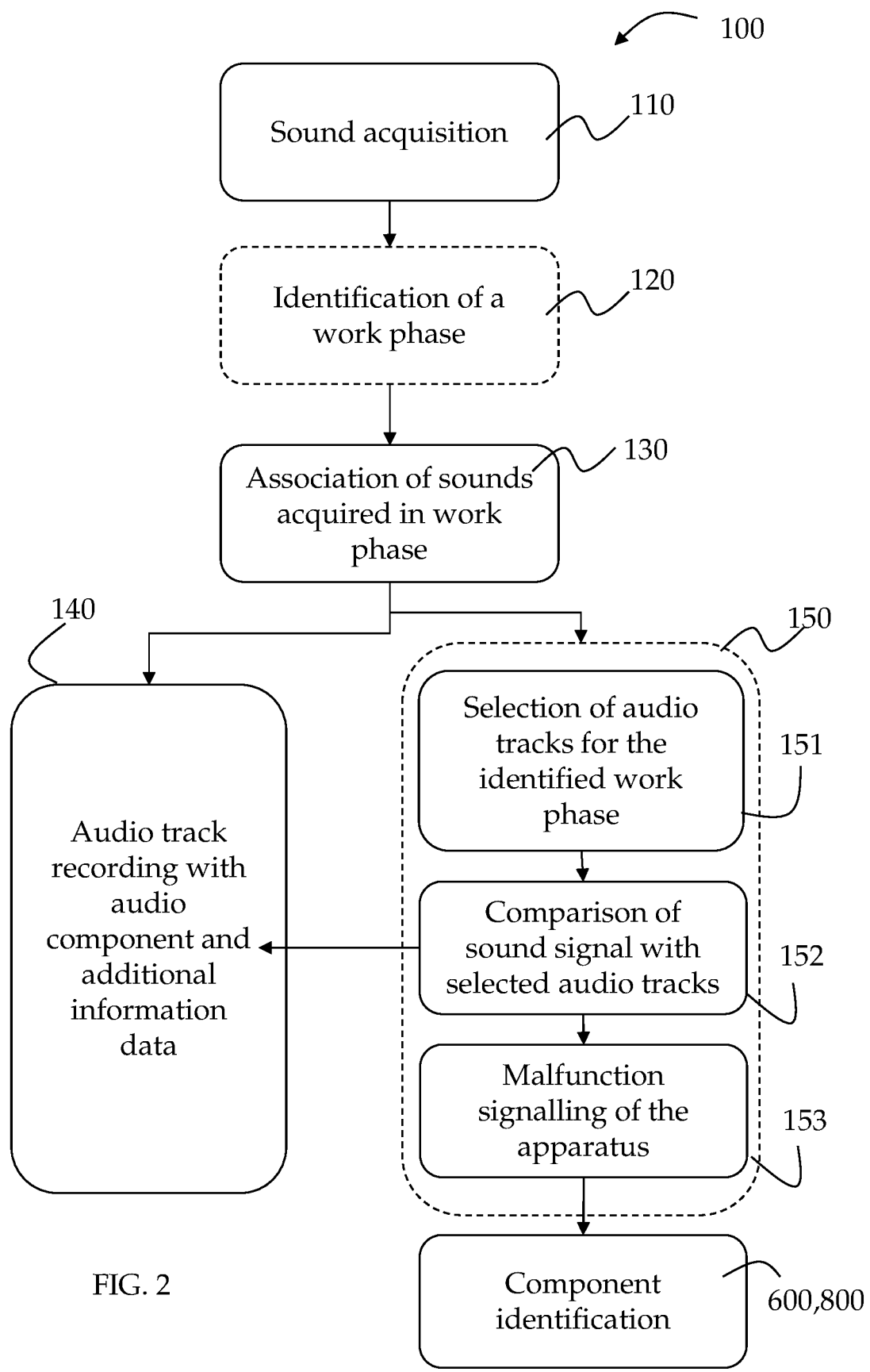
Figure 6:
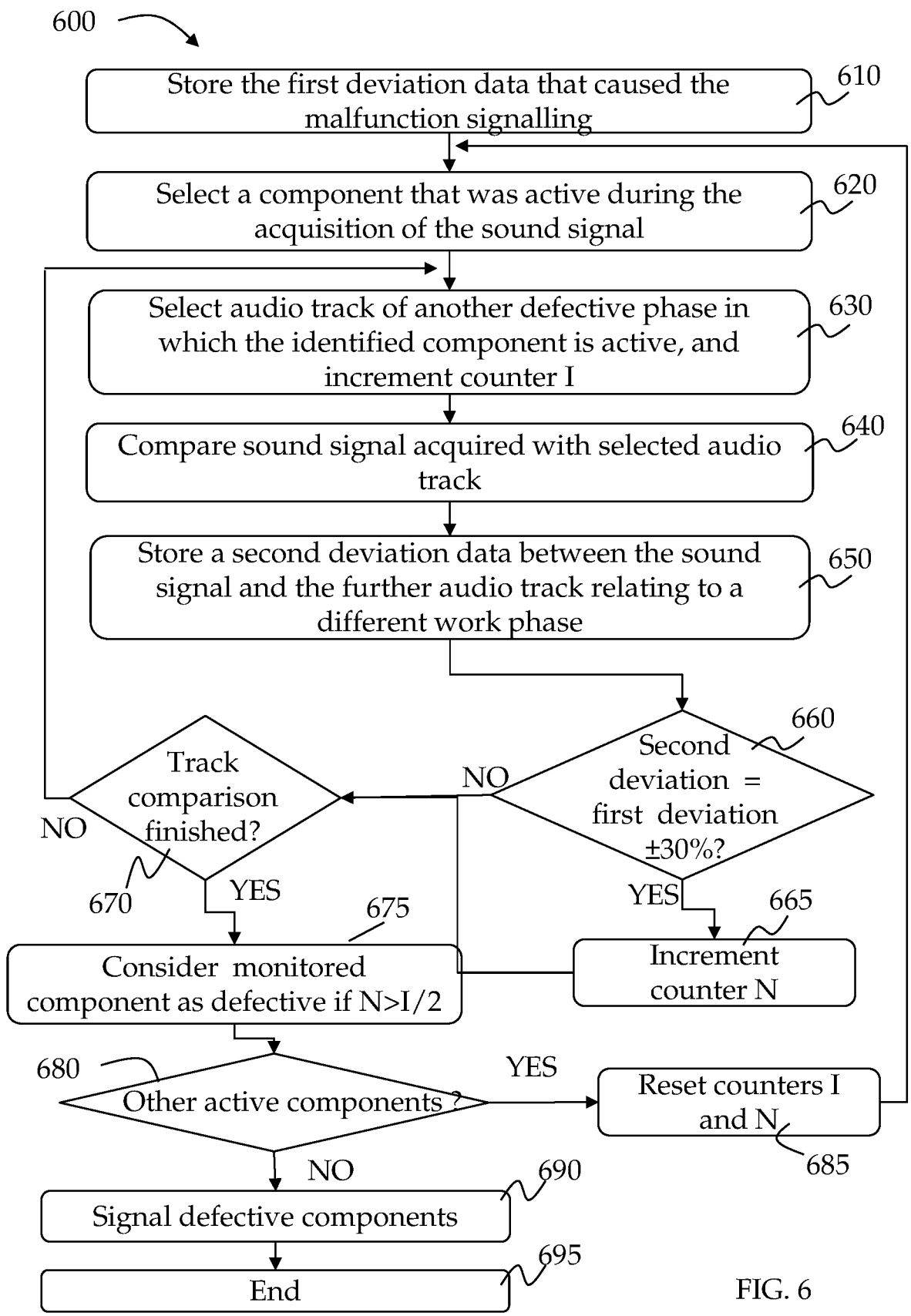
Figure 7:
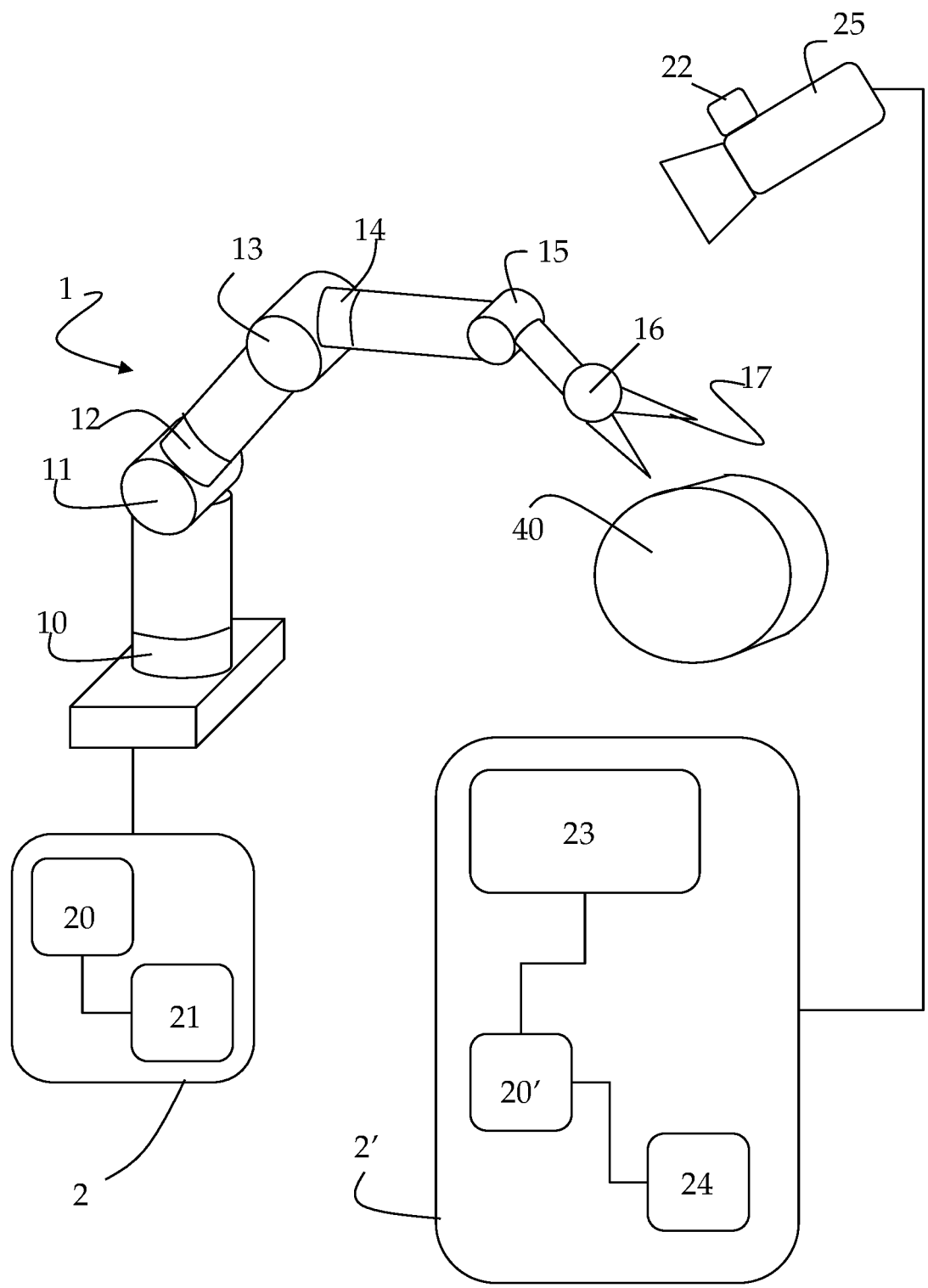
Figure 8:
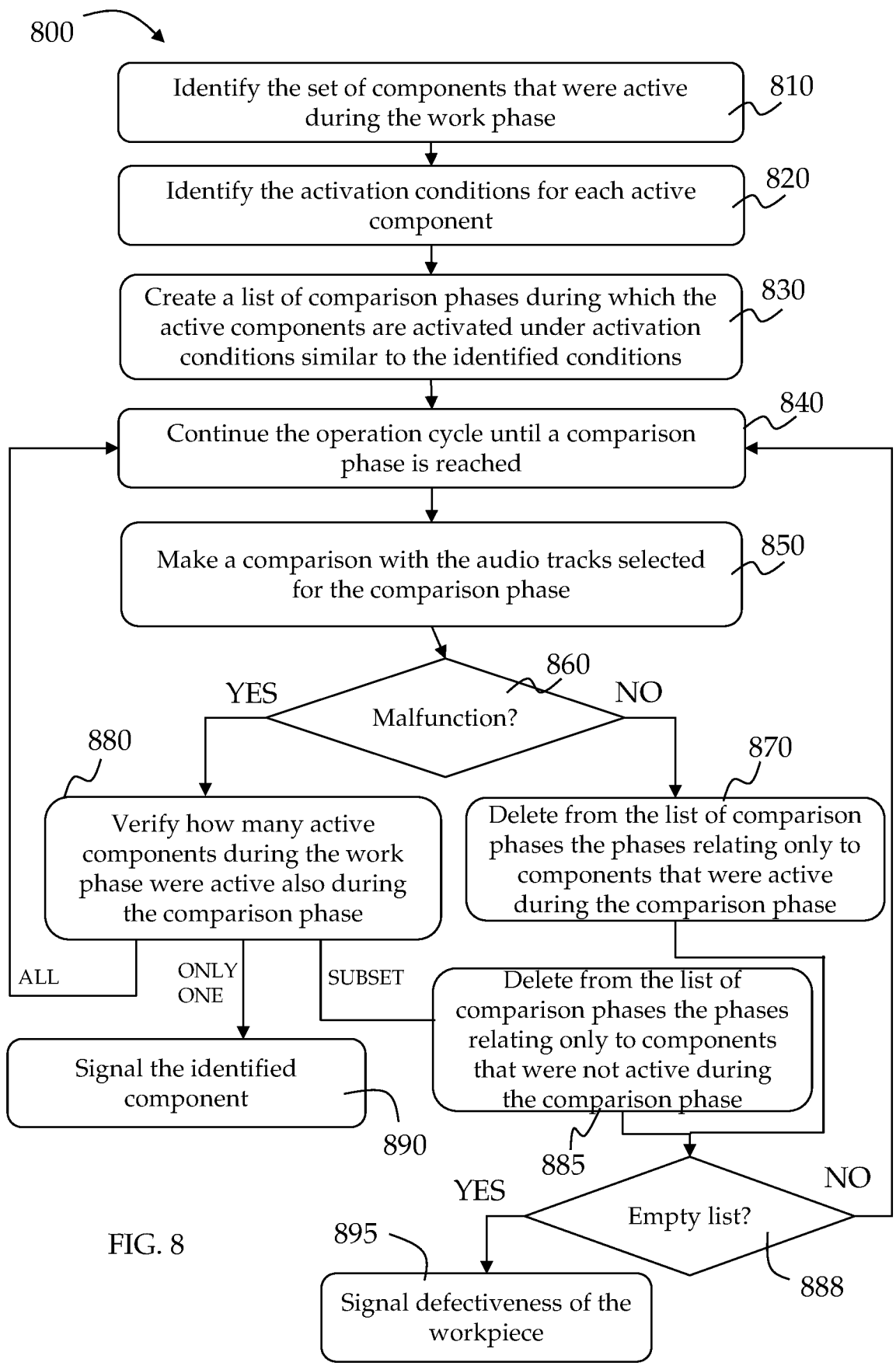

In such drawings,

FIG. 1 shows an apparatus and a control system of the same according to a first embodiment of the present invention;

FIG. 2 shows a flow diagram of a method for controlling the apparatus of FIG. 1 according to the present invention;

FIG. 3 shows an analogue sound signal emitted by the apparatus of FIG. 1;

FIG. 4 shows the sampling of the signal of FIG. 3;

FIG. 5 shows a digital signal generated by the sampling of FIG. 4;

FIG. 6 shows a flow diagram of a process for identifying defective components according to a first variant of the present invention; and FIG. 7 shows an apparatus and a control system of the same according to a second embodiment of the present invention, FIG. 8 shows a flow diagram of a process for identifying defective components according to a second variant of the present invention.

DETAILED DESCRIPTION OF THE INVENTION

In the following description, for the illustration of the figures, identical numbers or reference symbols are used to indicate construction elements with the same function. Further, for illustration clarity, some references may not be repeated in all the figures.

While the invention is susceptible to various modifications and alternative constructions, certain preferred embodiments are shown in the drawings and are described hereinbelow in detail. It is in any case to be noted that there is no intention to limit the invention to the specific embodiment illustrated, rather on the contrary, the invention intends covering all the modifications, alternative and equivalent constructions that fall within the scope of the invention as defined in the claims.

The use of "for example", "etc.", "or" indicates non-exclusive alternatives without limitation unless otherwise indicated. The use of "comprises" and "includes" means "comprises or includes, but not limited to", unless otherwise indicated.

With reference to FIG. 1, an apparatus 1 controlled by a first electronic control system 2 is shown. In the example of FIG. 1, the apparatus 1 is a robotic arm with six degrees of freedom, capable of carrying out a complex operation cycle, for example painting a car. Alternatively, the apparatus 1 can be any other apparatus comprising a plurality of components which are activated in different times and ways, for example the apparatus can be a vehicle, such as a car, or a device, such as a tool machine or a set of devices such as an automatic assembly line.

Going back to the example of the robotic arm 1, this one comprises a plurality of motors 10, 11, 12, 13, 14, 15, 16, which allow the rotation of the various sections of the robotic arm and the opening/closing of the grippers 17. The first control system 2 is operatively connected to the robotic arm 1 and sends command signals to the motors 10-13 to perform the operation cycle. The connection between the first control system 2 and the robotic arm 1 can be wired or wireless.

In one embodiment, the first control system 2 comprises a control unit 20—for example a microprocessor—and a non-volatile memory unit 21, in which code instructions are stored which, when executed, allow to implement a control method of the apparatus 1. Alternatively, the first control system 2 can be a programmable logic controller (PLC) or other known control system.

According to such a control method, when the apparatus is switched on, the first control system 2 starts the operation cycle by sending commands to the components of the apparatus to execute the operation cycle of the apparatus. The operation cycle consists of a plurality of work phases, for example a first phase in which the motor 10 is activated with a certain speed to lower the arm, a second phase in which the motors 11 and 12 are activated to tilt other arm sections, and so on. For the purposes of the present description, a work phase is understood in a broad sense as a series of operations that can be carried out by several components of the apparatus in a given time interval, or a series of operations that are carried out by a single component. An operation cycle can therefore be understood as consisting of several work phases that follow one after the other, or that overlap temporarily because they are executed simultaneously, for example the work phase of the motor 10 and the one of the motor 11 when they are activated simultaneously.

Each work phase is therefore identified either by a specific time instant (absolute or relative) and/or by the start of a certain component, in this way the control unit 20 knows at each instant of time which work phase is started.

In the embodiment of FIG. 1, the first control system 2 further comprises an acoustic transducer, in particular a microphone 22, positioned so as to detect the sounds emitted by the apparatus 1 during the operation cycle. In the example described herein, the transducer 22 is an analogue microphone that acquires the sounds emitted by the apparatus and transmits data packages to an acquisition interface 23 which comprises an analogue digital converter (A/D Converter) to digitize the acquired sound signals. Alternatively, the microphone can be a digital microphone that acquires the sound signals discreetly and outputs data packages that represent the sound signals. The microphone can conveniently consist of a plurality of microphones that can detect the sound emitted by different parts of the robot, also using software for spatial detection of sound sources and suppression of background noise.

In an alternative embodiment, shown in FIG. 7, a second control system 2' is provided additionally, separate from the first one 2, provided with a second control unit 20'. The second control system 2' is connected through a relative acquisition interface 23 of the second control system 2' to a transducer 22 external to the apparatus 1, for example the microphone of a video camera 25 capable of acquiring a signal comprising an audio and a video component.

As shown in FIG. 3, the sound waves acquired by the transducer 22 are converted into an analogue electrical signal S having a voltage (V) which varies over time during the different work phases F0, F1 and F2. The analogue signal S is then sampled, as shown in FIG. 4 where a dot indicates the voltage value taken at each sampling instant, and then converted into a digital signal (represented in FIG. 5).

In the example of FIG. 5, the digital signal consists of a sequence of bits representing the values of the samples $C_0$, $C_1$, $C_2 \ldots C_N$. More preferably, the digital signal transferred to the control unit consists of data packages having a header and a payload and structured to carry a greater number of information, such as for example an acquisition time of each sample.

The control unit 20,20' therefore starts a process 100 for detecting malfunctions of the apparatus which begins with the reception (step 110) of the sound signals acquired by the acoustic transducer 22, and which provides for associating (step 130) the sound signals with a respective work phase of the apparatus 1.

If the process for detecting malfunctions is started by the same control unit 20 which sends command signals to the motors 10-13 to execute the operation cycle, said control unit 20 has information about the work phase to which the acquired sound signals refer and can therefore proceed directly to the association of step 130.

If, on the contrary, the two processes are controlled by separate units 20,20' (second embodiment of FIG. 7), the work phase is determined (step 120) on the basis of a sequence of images disclosed by at least one detector of images 25, such as for example a video camera, which frames the apparatus 1. Through an appropriate image processing, the second control unit 20' is able to identify the work phases of the apparatus based on the position and the condition of its components, as well as on the position and conditions of the workpiece 40, that is the piece on which the apparatus is acting.

With reference to the example of FIGS. 3-5, the control unit continuously receives digital data representing the sound signals produced by the apparatus during the various work phases. By knowing the work phases that are carried out, the control unit is able to identify the single sound signals associated with each work phase, i.e. the portions of the sound signal acquired continuously, which are associated with each work phase. In the example considered, the control unit recognizes that the first three samples $C_0$, $C_1$ and $C_2$ belong to the first phase F0, the subsequent nine samples to the second phase F1, and so on.

Although FIG. 4 shows samples taken with a low sampling frequency, in order to allow an easier understanding of the embodiment, in the preferred embodiments the sampling frequency is preferably equal to or greater than 20 kHz; for each work phase $F_i$ several hundreds or thousands of samples $C_j$ are therefore acquired.

On the basis of the set of sound signals, in the form of samples, collected for each phase, the control unit continues two sub-processes ('threads') substantially in parallel: a learning process 140 and a malfunction verification process 150.

The learning process 140 generates, starting from the sound signals collected for each phase, a respective audio track accompanied by a plurality of additional information data, and records it in a memory area 24 connected to the control unit 20,20'.

The recorded audio track comprises an audio component—in the format acquired by the sensor (raw format) or in the form of a mathematical model, for example obtained through a neural network—which represents the sound signals acquired during a specific work phase of the apparatus, and a plurality of additional information data, including an identifier of the work phase executed by the apparatus during the acquisition of the sound signals that form the audio component.

According to the present invention, the additional information data additionally comprise information relating to the components that were active during the work phase during which the samples of the sound signal $C_J$ (with J being a positive integer greater than or equal to zero) were acquired.

Again, the additional data may comprise environmental parameters relating to the operating conditions of the apparatus during the acquisition of the sound signal (such as a working temperature of the machine), operating parameters of the apparatus and/or its components during the acquisition of the signal sound, for example, a temperature of lubricating oils, an operation speed of a motor, operation parameters of a component, the absolute and/or relative position of the machine members and workpieces and so on.

Furthermore, the additional information data preferably comprise information about whether or not the relative audio component refers to a malfunction that has taken place during the specific work phase of the apparatus.

During the malfunction verification process 150, the control unit selects (step 151) one or more audio tracks stored in the memory area 24, and relating to the same work phase identified in step 120. The identification of said audio tracks is made possible thanks to the additional information data.

Subsequently, the malfunction detection process provides for comparing (step 152) the received sound signal and relating to the identified phase, with the selected tracks.

For example, if the control unit has identified that the work phase is phase F0, once the digital audio file relating to this phase has been received (in the abstract example of FIG. 5 consisting of the first three samples $C_0$-$C_2$), it compares it with the previously stored audio tracks, using algorithms capable of detecting the characteristic differences of a malfunction of the apparatus.

The difference between the received sound signal and the recorded audio component can be measured in many ways known per se. For example, the digitized sound signal (or rather the set of payloads of the data packages that compose it) can be considered digitally as a sequence of bits having the value 1 and 0. A deviation between the received sound signal and an audio track can then be considered indicative of a malfunction if a percentage of different bits higher than a predetermined threshold is recorded. Alternatively, a deviation can be identified when there is a difference of at least N consecutive bits (with N being a default integer).

Again, in an alternative embodiment, a deviation between the received sound signal and the recorded audio component is considered indicative of a malfunction when the energy of the received signal differs from that of the audio component of the audio track beyond a predetermined threshold.

Again, in another embodiment, the comparison provides for identifying the frequencies composing the received sound signal and comparing them with those of the selected audio track.

In one embodiment, the presence of an audio frequency, not present in the audio track and with an amplitude higher than a predetermined value, is considered indicative of a malfunction.

If the measured deviation exceeds a predetermined threshold and a malfunction of the apparatus is thus identified, the information on the malfunction is used by the control unit to signal a malfunction (step 153), for example by activating a visual or sound alarm that a local operator can hear, by sending an alarm signal to a remote control centre or by sending commands of corrective action to the apparatus itself.

Once the presence of a deviation indicative of a malfunction has been determined or not, the information of correct operation or malfunction is recorded among the additional information data of the audio track generated during the learning process 140 or, otherwise, the previously generated audio track is maintained in the memory area 24 only if, from the comparison made in step 152, it emerges that the corresponding sound signal can be associated with a correct operation.

In the presence of a deviation indicating a malfunction of the apparatus, the control unit 20,20' implements a further process for identifying the defective components, described below with reference to FIG. 6. During a work phase of the apparatus, in fact, several components can be active, therefore the detection of a malfunction by itself does not indicate which component is defective.

In the example of FIG. 6, the process 600 for identifying the defective components provides, first of all, for storing (step 610) a first deviation data, which is preferably the deviation that gave rise to the malfunction signalling of the apparatus in step 153 of the method described above with reference to FIG. 2.

Subsequently, the method provides for identifying (step 620) a list of components that were active during the work phase to which the sound signal acquired in step 110 refers and selecting one, for example the motor 10 of the robotic arm 1.

Then it is proceeded with selecting (step 630) an additional audio track relating to a different phase of the operation cycle in which the selected component is active, also called the 'comparison phase'. In particular, the comparison phase is a work phase different from the one identified in step 120, but in which the selected component is activated under substantially equal operation conditions.

For the purposes of the present invention, 'substantially equal' means a value which deviates from the reference value by more than a deviation percentage chosen in the range between 0% and ±20%. If, for example, we refer to a work phase in which the motor 10 is activated at 200 rpm and at an ambient temperature of 30° C., we will consider an activation which is substantially equal to the one in which the motor 10 is activated at a speed comprised between 180 and 220 rpm, thus implying a deviation percentage of ±10%, and in which the temperature is comprised between 29.7° C. and 30.3° C. corresponding to a deviation percentage of ±1%.

According to a first variant, the further audio track with which the sound signal acquired in step 110 is compared, is an audio track relating to a work phase in which a malfunction occurred. The identification of said additional audio track among the many recorded is possible thanks to the additional information data of the audio track and presupposes that said additional information data comprise information about whether or not the relative audio component refers to a malfunction that occurred during the specific work phase of the apparatus.

With the selection of the audio track, a counter I which takes into account the number of comparisons made between the sound signal acquired in step 110 and the audio tracks is incremented. With the first selection of the aforesaid further defective audio track, the counter I is set to 1, then at each subsequent selection I it is incremented.

After selecting the audio track in step 630, the method provides for comparing (step 640) the sound signal acquired in step 110 with the selected audio track.

Once the comparison has been made, the control unit stores (step 650) a second deviation data, which is the deviation between the sound signal acquired in step 110, and the further audio track.

The second deviation is measured with the same procedures made for the detection of the first deviation and described with reference to step 152.

Subsequently, the method provides for verifying (step 660) whether the first deviation data and the second deviation data are "similar", that is, if they differ less than a predetermined threshold.

In the example described herein, the threshold is 30%, therefore the method provides for verifying whether the second deviation data is equal to the first deviation data except for a variation of ±30%. In the affirmative case, a counter N (step 665) which takes into account the number of matches found between the analysed sound signal and the stored audio tracks and relating to other defective phases in which the component under investigation is activated under substantially equal operation conditions is incremented.

At this point, the method provides for repeating the comparison between the sound signal acquired in step 110 and further audio tracks relating to the comparison phases identified in step 630, in which the component under investigation is activated in a substantially equal manner. This is represented in the diagram of FIG. 6 by the decision block 670.

Once the audio tracks with which to compare the sound signal are finished, the method provides for determining (step 675) whether N>I/2, that is whether the deviation that gave rise to the malfunction signal in step 1052, is "similar" to most of the measured deviations between the sound signal and the selected audio tracks. In the positive case, that is, if N>I/2, then it is determined that the component under investigation is defective and will be signalled in step 690 described below.

Alternatively, in step 675 the method can provide for determining whether N is greater than or equal to a predetermined threshold value $N_{threshold}$, with $N_{threshold} \geq 1$.

In the embodiment described herein, the process continues by verifying (step 680) whether, during the acquisition of the sound signal—a result indicating an apparatus malfunction—other components were active, and in the positive case the counters I and N are reset (step 685) and the steps 620-680 described above are repeated to verify any defectiveness by comparing the sound signal with other stored audio tracks relating to phases in which the further active components were activated in a substantially equal manner.

Once the verification of all the components has been completed, the process provides for signalling the defective components to the user (step 690), for example by activating a sound or visual alarm or by transmitting an alarm signal to a remote centre. The process for detecting defective components then ends (step 695).

In case in the memory area 24 only audio tracks are kept whose sound signal can be associated with a correct operation, it is possible to implement a second variant of the invention illustrated in FIG. 8.

According to said variant, when a deviation indicating a malfunction of the apparatus is detected, the control unit 20,20' signals the user the malfunction condition and activates a process 800 for identifying the defective components. The control unit 20,20' can be possibly configured to allow the operator to decide whether to activate the process for identifying the defective components or to intervene directly, also according to the entity of the detected deviation.

The process 800 for identifying defective components first of all provides for identifying (step 810) a list of active components during the work phase to which the sound signal acquired in step 102 refers and determining (step 820) the operation conditions under which the active components are activated.

For each active component all the phases of the operation cycle are therefore identified (step 830) in which the determined component under investigation is active under substantially equal operation conditions, also called 'comparison phases'. Again also in this case 'substantially equal operation conditions' refers basically to the same operation conditions identifiable by operation parameters of a value that deviates at most from the reference value by a deviation percentage chosen in the range between ±0% and ±20%.

The operation cycle is therefore continued (step 840) and, once a first comparison phase among those identified has been reached, in step 850 a comparison is made between a sound signal acquired during the first comparison phase and the audio tracks associated with said comparison phase.

If, even during the comparison phase, a malfunction is detected (decision block 860), it is verified (step 880) which one of the components under investigation is also active in said comparison phase:

a) if during the comparison phase all the components that were active during the work phase are active, no deductions can be made and therefore the operation cycle is continued;

b) if during the comparison phase a subset of the components that were active during the work phase is active, the components—among those under investigation—that were not active during the comparison phase are considered non-defective and excluded from further verifications; the comparison phases that, among the components under investigation, have only excluded components active are deleted from the list of comparison phases (step 885); and c) if during the comparison phase only one component among those active during the work phase is active, the probability that said component is defective is signalled (step 890).

In the cases a) and b), the process for identifying the defective components provides for further continuing the operation cycle (step 840) and, once a subsequent comparison phase has been reached, making a comparison (step 850) between the sound signal acquired during the reached comparison phase and the plurality of audio tracks associated therewith, to then carry out the assessments of the subsequent steps.

In particular, in case b) before continuing with the operation cycle (step 840) it is verified (step 888) that the list of the comparison phases still comprises comparison phases. In the negative case—that is, if all the comparison phases have been deleted, thus excluding all the components activated during the work phase from the verifications—a probable defect in the workpiece 40 (step 895) is signalled.

Otherwise, if no malfunction is detected during the comparison phase, it is verified which one of the components under investigation is active in said comparison phase. The active components during the comparison phase are therefore considered as non-defective and excluded from further verifications; the comparison phases that, among the components under investigation, have only excluded components active are deleted from the list of comparison phases (step 870).

Also in this case the identification process of the defective components provides for verifying (step 888) that the list of the comparison phases still comprises comparison phases. In the affirmative case, the operation cycle (step 840) is continued and, once a subsequent comparison phase is reached, a comparison (step 850) is made between the sound signal acquired during the subsequent comparison phase and the plurality of audio tracks associated therewith, to then carry out the assessments of the next steps. Otherwise, if the list of the comparison phases is empty, a probable defect in the workpiece 40 (step 895) is signalled.

Steps 840-888 are repeated until the defective component is identified (step 890) or the defectiveness of the workpiece 40 is identified (step 895).

In light of the above it is clear how the system and the methods described above allow to achieve the proposed purposes.

It is also clear that the person skilled in the art will be able to make variations to the examples described above without departing from the scope of protection of the present invention, which is defined by the appended claims.

For example, although the invention has been described with reference to particular block diagrams, the same functions can be implemented by circuit blocks differently grouped or integrated. For example, the control functions of the apparatus and those for detecting malfunctions can be performed by different integrated circuits or by different communicating devices.

Furthermore, the method described above can be carried out using an artificial intelligence system either in the cloud (or on a remote server) or directly within the control system, and the learning phase can be executed "off-line", that is before the installation of the software on the apparatus to be monitored. For example, different audio tracks for a determined apparatus model can be recorded during the operation of a sample apparatus, and then loaded into the control system of the apparatus to be monitored.

Again, the transducers used to acquire the sound signals emitted by the apparatus during its operation can be of different numbers and types. For example, it is possible to provide for the use of a plurality of microphones appropriately directed on functional components/groups of the machine which one wishes to keep under close observation. In general, if different microphones are used, in one embodiment the sound signal of each microphone is compared with the stored audio tracks as described above with reference to the example of FIG. 1, in which there is a single transducer 22. Advantageously, in one embodiment, if different transducers—or microphones—are used, the stored audio tracks also comprise data relating to the direction or the acquisition microphone, so that the sound signal acquired by a microphone is compared with audio tracks previously acquired by the same microphone. In one embodiment, the signals coming from a multiplicity of microphones are processed, in a per se known way, in order to be able to detect a spatial mapping of the sound sources thus identifying audio voxels. In this embodiment, a distinct audio track is made available for each voxel, therefore the sound signal acquired for a given voxel is compared with audio tracks recorded for the same voxel. Voxel information is included among the additional information data of the audio track.

Again, according to a variant of the methods described above, a user verification is provided in the event that the system detects a malfunction of the apparatus and/or a defect of a component.

In detail, after signalling the malfunction of the apparatus and/or the defective component to the user, the system—in particular the control unit 20,20'—awaits an assessment by the operator who, by verifying the apparatus and/or the component, determines whether a malfunction and/or a defect of the component signalled as defective has occurred. The assessment by the operator can be carried out through a system user interface, for example by pressing a button specifically provided to "confirm" or to "deny" the assessment made by the algorithm, or through a monitor or another interface (for example audio) with which the operator can interact by providing more complex commands/inputs, such as for example the indication of the defective component, if different from the one identified by the system.

In this embodiment, the system, therefore, at the time of recording the audio track relating to the acquired sound signal (subprocess 140 described above), will record among the additional information data a data that identifies the track as relating to a phase with malfunctions and/or defective components, if the operator has confirmed the malfunction of the apparatus and/or the defectiveness of the component, so as to gradually increase the accuracy of the system.

The invention claimed is:

1. A method for detecting malfunctions in an apparatus and/or defects in a workpiece processed by said apparatus, comprising the steps of:

acquiring a sound signal emitted by an apparatus during an operation cycle of the apparatus, wherein the operation cycle is subdivided into a plurality of work phases during which a plurality of components are operated simultaneously, and during the acquisition of the sound signal a work phase of said plurality of work phases is identified, comparing the sound signal with a plurality of audio tracks stored in a memory area, wherein each audio track of said plurality of stored audio tracks comprises an audio component relating to acquired sound signals, and additional information data comprising at least one identifier of the work phase executed by the apparatus during the acquisition of the sound signals of the audio component, and wherein said plurality of audio tracks used for the comparison with the sound signal is a group of audio tracks of said plurality of audio tracks whose identifier of the work phase of the apparatus corresponds to the identified work phase, determining at least one of a malfunction of the apparatus and a defect of the workpiece processed by the apparatus based on the result of said comparison, by identifying the plurality of components operated during the identified work phase, wherein identification data of the audio tracks additionally comprise at least one identifier of the plurality of components operated during the phase to which the audio component refers, on the basis of said plurality of operated components, identifying a set of comparison phases among said plurality of phases of the operation cycle, and identifying as defective at least one of at least one component among said plurality of components operated during the work phase and the workpiece, on the basis of the audio tracks relating to the set of comparison phases identified and/or on the basis of sound signals acquired during the identified comparison phases, by acquiring a sound signal emitted by the apparatus during at least a first comparison phase of the set of comparison phases;

comparing the acquired sound signal with a plurality of audio tracks relating to the at least a first comparison phase; and according to the outcome of the comparison, identifying as defective at least one component between said plurality of components operated both during the at least a first comparison phase and during the work phase, or the workpiece, wherein, if the outcome of the comparison identifies a malfunction of the at least a first comparison phase and during the at least a first comparison phase, a subset of the components operated during the work phase is operated, identifying as non-defective the components operated in the work phase, but not operated during the at least a first comparison phase and updating the set of the comparison phases, keeping only the comparison phases in which the components belonging to the subset of the components are operated.

2. The method according to claim 1, wherein during the acquisition of the sound signal at least one value of an operating parameter of each component of the apparatus operated during the work phase is determined, wherein the additional information data comprise a value of said at least one operating parameter of each operated component of the apparatus, and wherein for the comparison with the sound signal, the audio tracks which comprise a value of said operating parameter substantially equal to the value of the determined parameter are selected from the group of audio tracks.

3. The method according to claim 1, wherein the set of comparison phases comprises phases of the operation cycle in which at least one component of said plurality of components operated during the work phase is operated, and said at least one component in common is operated in the comparison phase and in the work phase with substantially equal values of the operating parameters.

4. The method according to claim 1, further comprising the steps of:

storing a first deviation data relating to a deviation between the sound signal and one of said plurality of audio tracks which gave rise to a malfunction signalling of the apparatus, selecting a component of said plurality of components, comparing the sound signal with at least one further audio track relating to a comparison phase of said set of comparison phases, said comparison phase being a phase of said operation cycle in which a malfunction of the apparatus was recorded, storing at least one further deviation data, said at least one further deviation data representing a deviation between the acquired sound signal and said at least one further audio track, comparing the first deviation data with each further deviation data and verifying if they differ less than a threshold value, and signalling that the identified component is defective in the event that the first deviation data and the further deviation data differ less than the threshold value at least once.

5. The method according to claim 1, wherein if the outcome of the comparison identifies a malfunction of the at least a first comparison phase and during the at least a first comparison phase only one component in common is operated, signalling the only component in common as a defective component.

6. The method according to claim 1, wherein if the outcome of the comparison does not identify a malfunction of the comparison phase, identifying the components that were active during the comparison phase as non-defective and updating the set of the comparison phases, keeping only the comparison phases in which the remaining components are operated.

7. The method according to claim 1, wherein, after updating the set of comparison phases, the phase takes place which consists in verifying if the set of the comparison phases still comprises comparison phases and, in the negative case, signalling the workpiece as a defective piece.

8. The method according to claim 1, comprising storing in said storage area an audio track comprising an audio component corresponding to the acquired sound signal and at least one additional information data included in the group consisting of: an identification data of the work phase of the apparatus, data relating to the components operated during the acquisition of the sound signal, environmental parameters relating to the operating conditions of the apparatus during the acquisition of the sound signal, operating parameters of the apparatus and/or its components during the acquisition of the sound signal, absolute and/or relative position of the components and of the workpieces during the acquisition of the sound signal.

9. The method according to claim 1, wherein if the method determines a malfunction of the apparatus and/or identifies a defective component, the method further includes:
  signalling the defective component,
  receiving a malfunction confirmation/denial command of the component, and
  recording, among the additional information data, a data that identifies the track as relating to a phase with malfunctions and/or defective components, if the command confirming the malfunction of the component is received.

10. The method according to claim 1, wherein the step of identifying a work phase of said plurality of work phases comprises:
  acquiring a sequence of images of said apparatus,
  processing the acquired images to determine the position of the plurality of operated components and/or of at least one workpiece on which the operated components are acting;
  determining the work phase on the basis of the determined positions.

11. The method according to claim 1, wherein said plurality of audio tracks is stored in a plurality of computers connected to each other and wherein the step of comparing the sound signal with said plurality of audio tracks is executed in a distributed manner between said plurality of computers or locally on a computer receiving the sound signal.

12. A system for detecting malfunctions in an apparatus and/or defects in a workpiece with said apparatus, comprising:
  at least one transducer for acquiring a sound signal emitted by the apparatus during an operation cycle of the apparatus,
  a memory area adapted to preserve a plurality of audio tracks, wherein each audio track of said plurality of audio tracks comprises an audio component relating to acquired sound signals, and additional information data comprising at least one identifier of the work phase executed by the apparatus during the acquisition of the sound signals of the audio component, and
  a control unit operatively connected to the transducer and to the memory area and configured for
    identifying, among a plurality of work phases into which the operation cycle of the apparatus is subdivided, a work phase executed by the apparatus during the acquisition of the sound signal,
    selecting a plurality of audio tracks stored in the memory area on the basis of the identified work phase,
    comparing the sound signal with the audio component of the plurality of selected audio tracks, and
    determining a malfunction of the apparatus and/or a defectiveness of the workpiece processed by the apparatus based on the result of said comparison,
  wherein the identification data of the audio tracks additionally comprise at least one identifier of a plurality of components operated during the phase to which the audio component refers, and wherein the control unit is further configured for
    identifying a plurality of components operated during the work phase,
    on the basis of the operated components, identifying a set of comparison phases of the operation cycle with which a second plurality of audio tracks stored in the memory area is associated, and
    identifying as defective at least one component between said plurality of components operated during the work phase and/or the workpiece on the basis of the audio tracks relating to the set of comparison phases identified and/or on the basis of sound signals acquired during the identified comparison phases by
      acquiring a sound signal emitted by the apparatus during at least a first comparison phase of the set of comparison phases;
      comparing the acquired sound signal with a plurality of audio tracks relating to the at least a first comparison phase; and
      according to the outcome of the comparison, identifying as defective at least one component between said plurality of components operated both during the at least a first comparison phase and during the work phase, or the workpiece,
      wherein, if the outcome of the comparison identifies a malfunction of the at least a first comparison phase and during the at least a first comparison phase, a subset of the components operated during the work phase is operated, identifying as non-defective the components operated in the work phase, but not operated during the at least a first comparison phase and updating the set of the comparison phases, keeping only the comparison phases in which the components belonging to the subset of the components are operated.

13. The system according to claim 12, wherein the control unit is further configured to determine at least one operating parameter of each component of the apparatus operated during the work phase, and wherein the set of comparison phases comprises phases of the operation cycle in which at least one component of said plurality of components operated during the work phase is operated, and said at least one component in common is operated in the comparison phase and in the work phase with substantially equal values of the operating parameters.

14. The system according to claim 13, wherein the control unit is further configured for:
  storing a first deviation data relating to a deviation between the sound signal and one of said plurality of audio tracks which gave rise to a malfunction signalling of the apparatus,
  selecting an operated component of said plurality of operated components,
  comparing the sound signal with at least one further audio track relating to a comparison phase of said set of comparison phases, said comparison phase being a phase of said operation cycle in which a malfunction of the apparatus was recorded, storing at least one further deviation data, said at least one further deviation data representing a deviation between the acquired sound signal and said at least one further audio track, comparing the first deviation data with each further deviation data and verifying if they differ less than a threshold value, and signalling that the identified component is defective if the first deviation data and the further deviation data differ less than a threshold value at least once.

15. The system according to claim 12, wherein the memory area preserves information adapted to identify the work phase executed by the apparatus during the acquisition of the sound signal among the plurality of work phases into which the operation cycle of the apparatus is subdivided.

16. The system according to claim 12, wherein the control unit is configured for receiving a command that confirms, denies or corrects a malfunction assessment of the apparatus made by the control unit and/or an indication given by the control unit that a component is defective, and recording, among the additional information data, a data that identifies the track as relating to a phase with malfunctions and/or defective components, in the event of a command that confirms the malfunction of the component.

17. The system according to claim 12, wherein the control unit is operatively connected to an image detector configured to frame the apparatus and the control unit is further configured to carry out a processing of images of a sequence of images received by the image detector to identify the work phase executed by the apparatus during the acquisition of the sound signal.

* * * * *